United States Patent [19]

Halpern et al.

[11] 4,252,610
[45] Feb. 24, 1981

[54] TARGETS WHICH EMIT NEUTRONS WHEN IRRADIATED BY HIGH ENERGY BEAMS AND METHODS OF FABRICATING SUCH TARGETS

[75] Inventors: Gerald M. Halpern, Bridgewater; Hyogun Kim, Scotch Plains, both of N.J.

[73] Assignee: The University of Rochester, Rochester, N.Y.

[21] Appl. No.: 835,077

[22] Filed: Sep. 20, 1977

Related U.S. Application Data

[62] Division of Ser. No. 646,727, Jan. 5, 1976, Pat. No. 4,092,381.

[51] Int. Cl.³ .............................................. G21B 1/00
[52] U.S. Cl. .............................................. 176/9; 176/1
[58] Field of Search ................................. 176/1, 3, 9

[56] References Cited

U.S. PATENT DOCUMENTS

| | | | |
|---|---|---|---|
| 2,948,664 | 8/1960 | Rubens et al. | |
| 3,055,297 | 9/1962 | Leeds | |
| 3,228,848 | 1/1966 | Fellows | 176/39 |
| 3,452,123 | 6/1969 | Beckmann et al. | |
| 3,891,577 | 6/1975 | Kershaw et al. | |
| 3,939,509 | 2/1976 | Moore | 176/1 |
| 3,987,590 | 10/1976 | Chianelli | 176/1 |
| 4,003,007 | 1/1977 | Stewart | 176/1 |
| 4,034,032 | 7/1977 | Hendricks | 176/1 |

OTHER PUBLICATIONS

Nuclear Fusion, vol. 15, No. 5, 10/75, pp. 935-938, Mason et al.
Nature, Vol. 241, Feb. 1973, pp. 449, 450, Winterberg.
UCRL-75885, 10/74, Dahlbocka, pp. 1-15.
1954 U.S. Code Congressional and Administrative News, pp. 3466, 3467, 3480, 3532.
Legislative History of the Atomic Energy Act of 1954, vol. II, pp. 1759, 2305, 2373, 2374.
Legislative History of the Atomic Energy Act of 1954, vol. III, pp. 2849, 2859.
Nuclear Fusion, vol. 10, 1970, by Linhart, pp. 211, 212, 222, 225, 226.
Popular Science, Dec. 1976, pp. 66-71, 148, 150.
Laser Focus, 5/77, p. 6.
Science, vol. 188, 4/75, pp. 30-34.
New York Times, Jan. 30, 1973, p. 21.
Fortune, Dec. 1974, pp. 149, 152.
Nuclear News, 3/78, pp. 30-35.
FTD-HT-66-422, 3/67, by Choo et al., pp. 1-9.
National Defense, May-Jun. 1975, pp. 467-470, by Stowe.
Nature, vol. 258, Dec. 1975, pp. 512-514, by Winterberg.
Marwick, "Exploding Reactors For Power", 1/73, pp. 9-11, 16-20, 22, 26-34, 38, 40.
National Defense, May-Jun., 1978, pp. 538-543, 580-582, 584.
Rev. Sci. Instrum., vol. 45, No. 10, 10/74, pp. 1245-1252, by Friedman et al.
Nuclear Fusion, vol. 13, 1973, pp. 829-838, by Soures et al.
JETP Lett., vol. 21, No. 2, 1/75, pp. 68-70, Afanasler et al.
Nuclear Science & Eng., vol. 56, pp. 301-319, 1975, Seifritz et al.

*Primary Examiner*—Harvey E. Behrend
*Attorney, Agent, or Firm*—M. Lukacher

[57] ABSTRACT

Targets for high energy beams, such as laser beams, produced in laser fusion apparatus are described. The targets are porous spheres of deuterated hydrocarbon material, particularly deuterated polyethylene. The spheres are small and have diameters in the range of 50 to 300 microns. Higher neutron yields are obtained from these targets than from solid targets of similar materials, (viz., spherical targets of much higher density). Methods of fabricating the targets by forming them into solid spheres, cross linking their molecules and causing them to swell such that the resultant targets have a microscopically small sponge-like structure, are also described.

7 Claims, 3 Drawing Figures

TARGETS WHICH EMIT NEUTRONS WHEN IRRADIATED BY HIGH ENERGY BEAMS AND METHODS OF FABRICATING SUCH TARGETS

This is a division of Application Ser. No. 646,727, filed Jan. 5, 1976, now U.S. Pat. No. 4,092,381, issued May 30, 1978.

The present invention relates to targets for high energy beams which are generated in thermo-nuclear apparatus, such as laser fusion apparatus and to methods of fabricating such targets.

The invention is especially suitable for use in providing laser fusion targets. The structure of these targets is such that their implosion dynamics during interaction with a pulse of laser radiation more readily obtains thermo-nuclear burn conditions than is the case with conventional targets.

Conventional laser fusion targets are in the form of solid spherical bodies of deuterium or deuterium containing compounds. Such targets are described in an article by W. D. Friedman, G. M. Halpern and B. A. Brinker, entitled "Target Fabrication and Positioning Techniques for Laser Fusion Experiments", which appeared in the Review of Scientific Instruments, Volume 45, No. 10, October 1974, pages 1245 to 1252. Reference may be had to the aforementioned article and to an article by J. Soures, L. M. Goldman and M. Lubin, entitled "Short-Pulse Laser Heated Plasma Experiments" which appeared in "Nuclear Fusion" Volume 13 (1973) pages 829 to 838; and to M. J. Lubin, U.S. Pat. No. 3,723,246, issued Mar. 27, 1973, for descriptions of laser fusion apparatus with energy extracting means in which both solid targets and targets provided by this invention may be used to provide useful energy.

The following U.S. patent applications, which are assigned to the same assignee as this application, are related to this application in that they are concerned with targets which are adapted for use in laser fusion and the like apparatus. The applications are: Ser. No. 479,921, filed June 17, 1974 in the name of Gerald M. Halpern and Yehuda Paiss; and Ser. No. 547,143, filed Feb. 5, 1975 in the name of Russell R. Chianelli. Publications and patents referred to and cited in the Halpern and Paiss application may also be referred to for further information respecting laser fusion and the like apparatus and targets for use therein.

It is an object of this invention to provide improved targets which have higher neutron yields than conventional targets when irradiated by high energy beams, such as laser beams.

It is another object of the present invention to provide improved targets which are especially adapted to be heated and compressed to obtain thermonuclear conditions when high energy beams, such as laser beams, are incident thereon.

It is a further object of the present invention to provide improved thermonuclear fuel elements which are especially adapted for use in laser fusion apparatus.

It is a still further object of the present invention to provide improved targets from which high temperature plasmas can be obtained when heated by laser radiation.

It is a still further object of the present invention to provide improved targets of deuterated hydrocarbon material for use in laser fusion apparatus.

It is a still further object of the present invention to provide improved targets which are of porous structure and spherical shape from deuterated hydrocarbon materials, such as deuterated polyethylene.

Briefly described, a target provided by the present invention is a ball, preferably spheroidal or spherical in shape, of deuterated hydrocarbon material, preferably a polymer such as deuterated polyethylene, which may be of the type which is commercially available or which may be fabricated in accordance with well known polyethylene fabrication techniques. The targets themselves are exceedingly small, say in the range of 50 to 300 microns in diameter. Notwithstanding their small size, they have a structure extending inwardly from the surface thereof which is porous and sponge-like. The porous sponge-like structure may be a shell about a core of the body which is either solid or completely hollow. The body may have the porous sponge-like structure throughout. For a given amount of energy (e.g., laser pulse energy of the laser beam which is incident on the target as in a laser fusion apparatus) the targets compress and have improved implosion dynamics over solid spheres and produce higher neutron yields than such solid spheres.

Briefly described the method of producing such improved targets includes the forming of the deuterated hydro-carbon material (viz., deuterated polyethylene) into solid bodies which may be spheroidal or spherical in shape. The molecules of the material of these bodies are then cross-linked as by being irradiated with gamma rays. Then the cross-linked bodies are increased in size by causing these bodies to swell, with the aid of a fluid. The fluid is then removed (say by vacuum drying). The resultant bodies have the aforementioned porous sponge-like structure.

The foregoing and other features, objects and advantages of the invention as well as the best mode for practising and carrying out the invention and the presently preferred embodiments thereof will become more apparent from the following description and the accompanying drawings in which.

Figure 1:
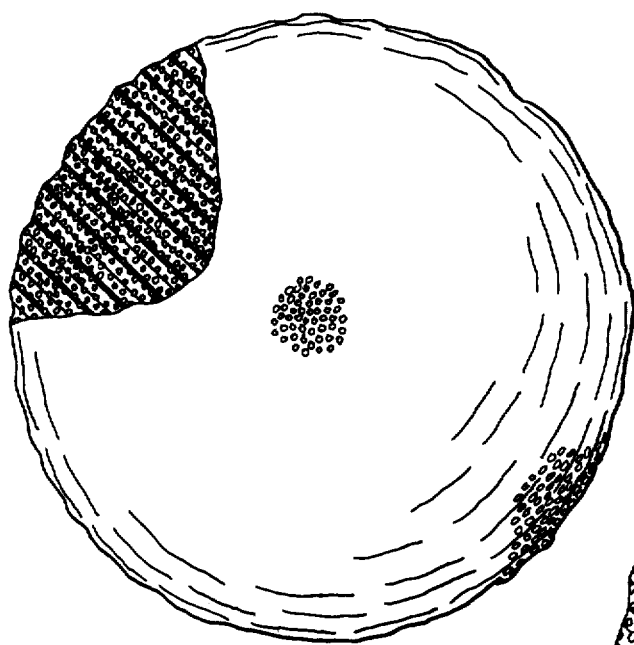
FIG. 1 is a perspective view, broken away to show the cross-sectional structure thereof, of a target which is provided in accordance with the invention.

FIG. 1 illustrates a target in the form of a sphere of deuterated polyethylene which, instead of being solid, has a porous sponge-like structure throughout. The sphere may be of a diameter in the range of about 300 microns and by virtue of the porous structure thereof has a density of from 0.1 to 0.2 grams per cubic centimeter. This is approximately ten to twenty percent of the density of solid polyethylene. Inasmuch as the pores in the structure are microscopic in size the target may be referred to as a "microsponge" target.

The target may be located at the focus of one or more laser beams in laser fusion apparatus of the type described in the above referenced articles, and/or in the Lubin patent. When laser pulse energy is incident on the target the target implodes and compresses. The result is a laser fusion reaction since the target material is heated to thermonuclear burn condition. Neutrons result from the reaction. By virtue of the structure of the target, the neutron yield may be one or two orders of magnitude greater than the yield obtained from a solid sphere of like diameter for a like amount of laser pulse energy, (viz., an increase of a factor of about 100 neutron yields may be realized with a microsponge target as shown in FIG. 1).

Figure 2:
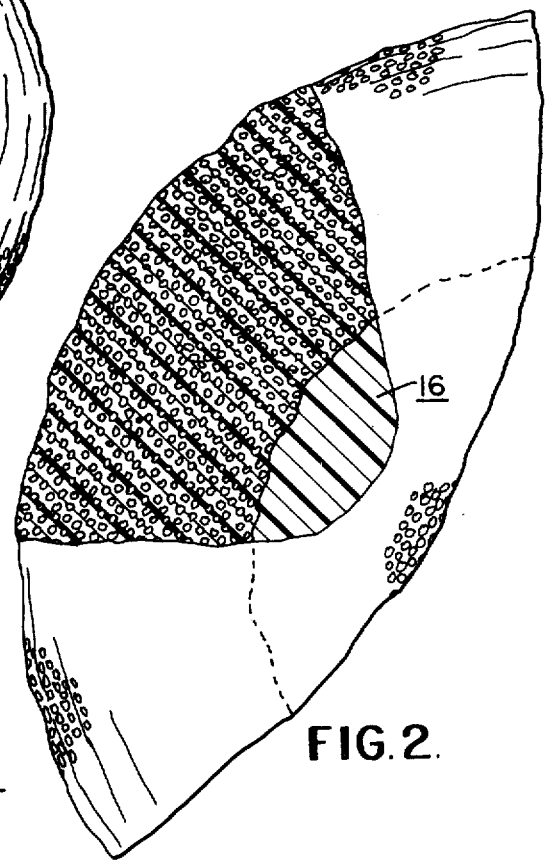
FIG. 2 is a view similar to FIG. 1 of a target provided in accordance with another embodiment of the invention.

FIG. 2 illustrates a microsponge target of similar size and shape as the target shown in FIG. 1. It will be noted, however, that only the outer shell 14 of the target is of the microsponge structure. The target has a core 16 which is solid. Both the shell 14 and the core 16 are of the same deuterated hydrocarbon material (e.g., polyethylene).

Figure 3:
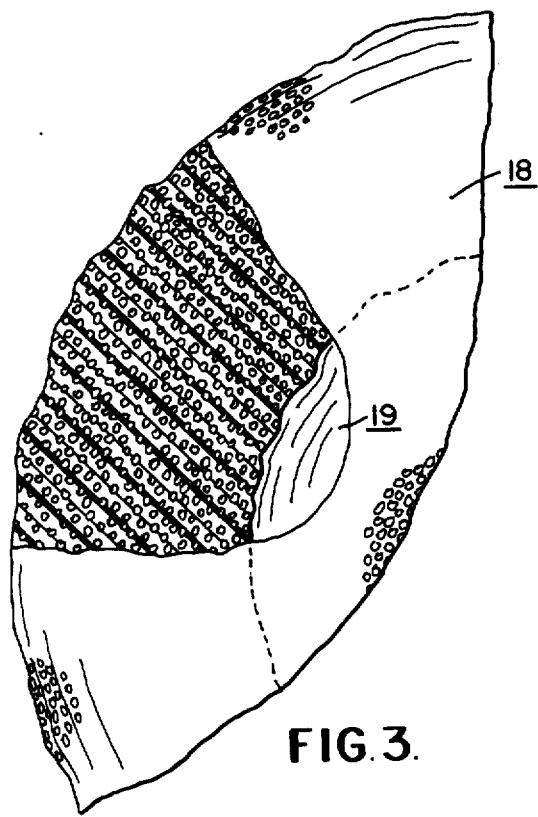
FIG. 3 is a view similar to FIG. 1 of a target provided in accordance with still another embodiment of the invention.

FIG. 3 shows a target of similar size and shape to the target shown in FIGS. 1 and 2. The target has an outer shell 18 of microsponge structure and a core 19 which is hollow. The hollow core provides a target which can be even more compressible and may have better implosion dynamics than the structure which is porous (microsponge) throughout, as shown in FIG. 1 or has a microsponge outer shell 14 and a solid core 16.

To fabricate targets such as shown in FIG. 1, the starting material used may for example be commercially available deuterated linearpolyethylene. A preferred material is polyethylene having a low molecular weight such that it flows at temperatures just above its melting point. Polyethylene having a melt index of from about 10 to about 15 may be used. The deuterated polyethylene which is obtainable from Bendix Corporation, Kansas City Division, Kansas City, Mo., 64141, having a melt index of 14.4 is suitable, by way of specific example.

The polyethylene polymer is then ground to a fine powder preferably by a micro blender, such as Model No. 4300 manufactured by Cole-Parmer of Chicago, Illinois, which is chilled with liquid nitrogen so as to make the polymer essentially brittle and enhance the pulverization thereof into fine powder. The material is pulverized to desired size (e.g., from 25 to 200 microns in diameter) by utilizing a sufficiently long grinding time in the micro blender and then sieving the particles which are below the maximum size desired (e.g., of about 200 microns maximum diameter).

The powder is then heated in a vessel containing silicone oil, Dow-Corning 20 Centistoke silicone oil for example, which is maintained at a temperature of about 150° C., for about ten minutes. The vessel containing the oil is gently agitated to minimize agglomeration of the particles. The vessel is then quenched by placing it in ice (ordinary wet ice). The resultant bodies are spherical in shape (spheres or spheroids) due to their melting in the silicone oil. Accordingly, the powder particles are formed into hard or dense spheres of from about 25 to about 200 microns in diameter. These bodies are washed in order to remove any residual silicone oil which may remain thereon. Washing in a solution of trichloroethylene, chloroform and methanol is preferably used to remove the residual silicone oil.

A batch of spherical bodies is then sealed in an evacuated glass tube and exposed to a flux of gamma rays. For example one megavolt (MeV) gamma rays derived from a cobalt 60 radiation source may be used. Dosages in a range from about 10 to about 40 megarads (MRad) is suitable, with a dosage in the range of from 20 to 30 MRad being preferred. The density of the resulting targets is a function of dosage, with lower dosages providing lower density and higher dosages providing higher density. Thus, the density can be continuously controlled ranging from about 10 to 100% of the bulk density value of the starting material.

In the event that targets having a hollow core such as shown in FIG. 3 are desired, the cross linking of only the outer layers of the spherical bodies is accomplished by using lower energy radiation. For example, 50 KeV electrons from an electron gun source.

The crosslinked spheres are then removed from the glass tube and caused to be increased in size by swelling to about 1½ to 2 times their original diameters. Swelling may be carried out by means of a fluid which diffuses into the bodies, dissolves the uncrosslinked component and expands the remainder. For example, a bath of hot solvent may be used to cause the crosslinked spheres to swell. The temperature of the bath is preferably from about 90° C. to about 120° C. in order to obtain the swelling without softening of the spheres and agglomeration or deformation thereof. A preferable temperature range for para-xylene is 100° to 110° C. The solvent may for example be para-xylene which is maintained at a temperature of about 105° C. The crosslinked spheres are immersed in the bath and maintained there for about two hours. The temperature of the bath and the immersion time determines the extent to which the solvent penetrates and diffuses into the spherical body. In the event that a low density shell surrounded by a high density core is desired (viz., the structure of the target shown in FIG. 2), it is desired that the solvent diffusion be incomplete and extend only into the outer layer of the spherical body. In order to obtain such incomplete diffusion and swelling of the outer shell of the bodies, swelling times of less than one hour can be used. The ratio of diameter of shell to diameter of core is controlled by both swelling time and temperature and may be selected accordingly.

The structure shown in FIG. 3 is obtained by virtue of the dissolution of the uncrossed linked core of the bodies by the solvent, while the crosslinked shell is only partially dissolved in a manner to form the highly porous micro structure common to the target shown in FIGS. 1, 2 and 3.

After the swelling time has expired, the vessel containing the bath is rapidly quenched by immersion in wet ice. This rapidly cools the bodies below their crystalization temperature and freezes in the highly porous micro structure. The excess solvent is then drained off and the spherical bodies are vacuum dried at room temperature for several hours to remove any residual solvent.

When the particles are dried they exhibit a snowball-like appearance due to light scattering from the highly porous micro structure. They are soft to the touch, in sharp contrast to solid spherical bodies of similar material. The diameters of the bodies vary from about 50 to 400 microns while the pores or cells which make up the micro structure are typically one micron or smaller in size. The densities of the microsponge targets may range from about 0.13 to 0.23 grams per centimeter as compared to solid deuterated polyethylene spheres (before swelling) which is about 0.96 grams per cubic centimeter.

From the foregoing description it will be apparent that there has been provided improved targets for use in laser fusion apparatus or like apparatus which uses high energy beams in order to produce plasmas and/or yield neutrons as a result of interactions of the particles with the beams. The balls of microsponge material are thus improved laser fusion targets. Variations and modifications in the targets themselves as well as in the methods of fabrication as described herein, within the scope of the invention, will undoubtedly suggest themselves to those skilled in the art. Accordingly, the foregoing description should be taken merely as illustrative and not in any limiting sense.

What is claimed is:

1. In a system comprising means for extracting useful energy in a controlled manner from a target which provides neutrons when a high energy beam is incident thereon, said target consisting of a body of deuterated hydrocarbon material having a porous, sponge-like micro-structure with pores typically not exceeding one micron in size extending inwardly from the outer surface thereof, said target providing useful energy in a controlled manner to said energy extracting means.

2. The invention as set forth in claim 1 wherein said material is a polymer.

3. The invention as set forth in claim 2 wherein said polymer is polyethylene.

4. The invention as set forth in claim 1 wherein said body has an outer shell and a core, said core being solid and said outer shell being of said porous, sponge-like structure.

5. The invention as set forth in claim 4 wherein the body has an outer shell and a core, said shell being of said porous sponge-like material and said core being hollow.

6. The invention as set forth in claim 3 wherein said structure has a density in the range from about 0.13 to 0.23 grams per cubic centimeter.

7. In a system comprising means for extracting useful energy in a controlled manner from a laser irradiated fusion target, said target comprising a porous spherical ball of deuterium containing material of diameter from about 50 to 400 microns having a sponge-like structure containing a multiplicity of cells distributed throughout said structure, said cells typically not exceeding one micron in size, said target providing useful energy in a controlled manner to said energy extracting means.

* * * * *